Dec. 31, 1940.   K. BLASIG   2,226,545
PRESSURE LIQUID OPERATED DEVICE
Filed Sept. 21, 1937
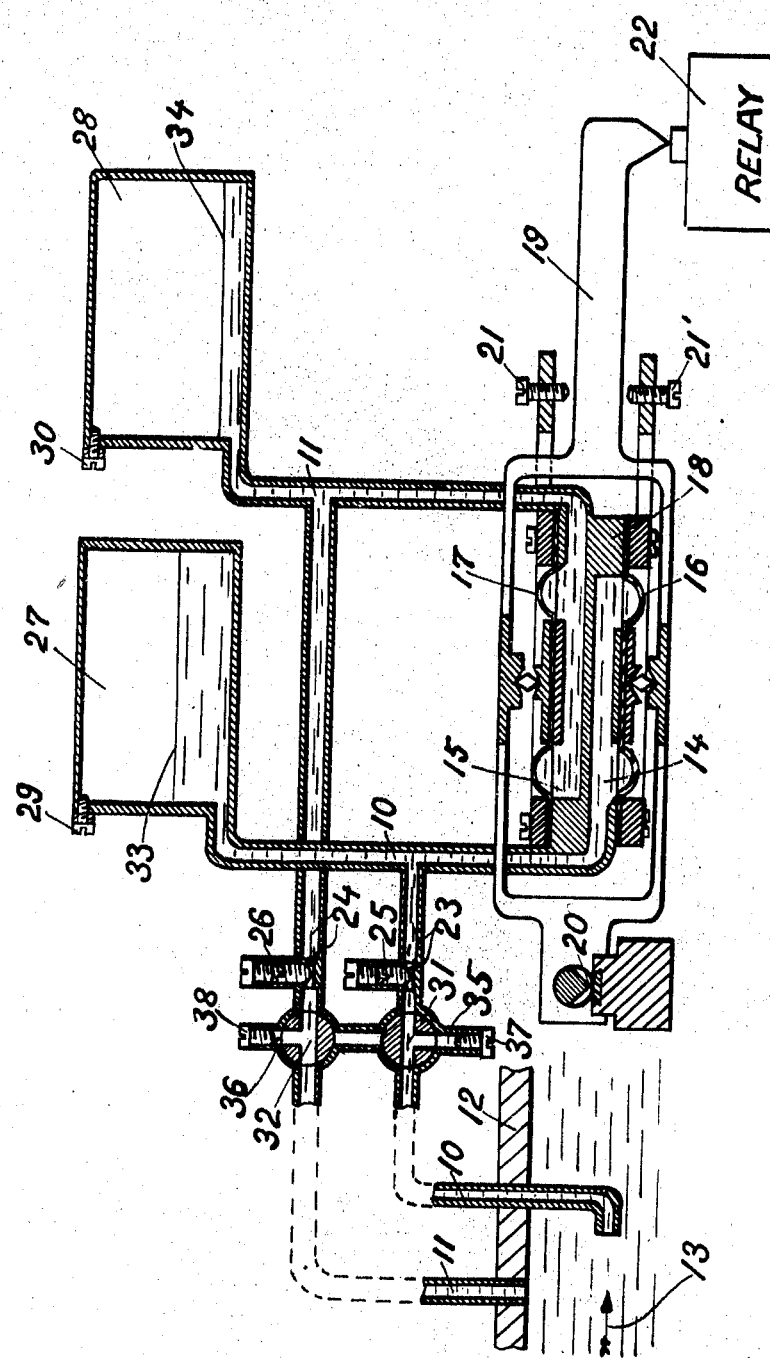
Inventor.

Patented Dec. 31, 1940

2,226,545

UNITED STATES PATENT OFFICE 2,226,545

PRESSURE LIQUID OPERATED DEVICE

Kurt Blasig, Berlin-Zehlendorf-Klein-Machnow, Germany, assignor to Askania-Werke A. G., a corporation of Germany Application September 21, 1937, Serial No. 164,945
In Germany October 12, 1936

4 Claims. (Cl. 137—156)

This invention relates to improvements in pressure liquid operated devices, more particularly in liquid pressure operated measuring instruments.

The principal object of this invention will become clear from the following example.

It may be assumed that two pressure responsive devices, for example diaphragms, are connected each to a separate conduit. In the one conduit a pressure gas is contained while the other conduit contains a liquid. Assuming now that at the ends of the conduits, remote from the diaphragms, the pressure fluctuates, it is easily understood that while the action of the gas on the diaphragm is elastic due to the compressibility of the gas, the action of the liquid on the respective diaphragms will be inelastic. If the diaphragms are employed for operating indicators, for example, it is easily understood that the liquid pressure indicator will be hard, or even impossible, to read due to its unsteadiness.

It is therefore an object of the present invention to provide an improved pressure liquid operated device which is steady in its action regardless of fluctuations in the liquid pressure.

Further aims, objects and advantages of this invention will appear from a consideration of the description which follows with the accompanying drawing showing for purely illustrative purposes an embodiment of this invention. It is to be understood, however, that the description is not to be taken in a limiting sense, the scope of this invention being defined in the appended claims.

Referring to the drawing, the figure shows diagrammatically a pressure liquid operated diaphragm device.

For illustrative purposes I have shown in the drawing my invention as applied to an apparatus for measuring and indicating the velocity of ships, which is disclosed in full detail in my copending application Ser. No. 102,426 of September 24, 1936. It is to be understood, however, that this invention is not limited to such application but useful in connection with any device or apparatus operated by pressure liquid.

A Pitot tube 10 and a static pressure tube 11 are shown as protruding below the bottom of a ship 12 into the water which moves relatively to the tubes in the direction indicated by the arrow 13. It is well known that the difference between the dynamic pressure in the Pitot tube 10 and the static pressure in the static tube 11 is a measure of the velocity of the ship.

The conduits 10 and 11 communicate with diaphragm chambers 14 and 15 formed by flexible diaphragms 16 and 17 and a diaphragm casing 18. The diaphragms are shown as acting upon a lever 19 pivoted at 20 and movable between stops 21 and 21'. The lever 19 is shown as actuating a relay diagrammatically indicated at 22. Inasmuch as further details of the relay and the other parts actuated thereby are dispensable for understanding the present invention, these parts are omitted and reference is made to my copending application Ser. No. 102,426 of September 24, 1936.

In the conduits 10 and 11 means are provided for offering a flow resistance to a fluid flowing therethrough. For this purpose constrictions 23 and 24 are shown which are adjustable by means of screws 25 and 26, respectively. The conduits 10 and 11 are further connected with chambers 27 and 28 containing a charge of a compressible pressure fluid, such as air, gas, or the like. The chambers may be provided with vent openings normally closed by screws 29 and 30. For shutting off the diaphragms in the chambers from the Pitot and the static tube, valves 31 and 32 may be provided.

Assuming first that the constrictions 23 and 24 and the chambers 28 and 27 are not present, it follows that any fluctuation in pressure at the opening of the tubes 10 and 11 will be transmitted through the liquid filled conduits and act on the diaphragms. The diaphragm actuated lever 19 will therefore be caused to move unsteadily. This disadvantage is overcome by the present invention, the illustrated embodiment of which operates as follows:

It may be assumed again that the water be flowing relatively to the Pitot and the static tube setting up pressures therein. With the valves 31 and 32 in the position as shown in the drawing it follows that water under pressure will enter the diaphragm chambers and also the chambers 27 and 28 compressing the compressible pressure fluid therein and rising to a certain level indicated at 33 and 34.

Assuming now that due to waves or other causes the pressure at the openings of the conduits 10 and 11 remote from the diaphragms, fluctuates, the fluctuations will cause the liquid to flow in the conduits compressing the volume of gas or air in the chambers 27 and 28. When the constrictions 25 and 26 are nearly closed the pressure fluctuations producing the flow of liquid through the conduits will be greatly dampened and the action of the liquid on the diaphragm will be steadied. The degree of dampening may therefore be adjusted by further opening or closing the constrictions 23 and 24.

The action of the liquid on the diaphragms is therefore comparable to the action of a compressible pressure fluid.

The principle of my invention is as follows:

By providing chambers containing a compressible pressure fluid and communicating with a pressure liquid operated device, liquid flows are created in response to fluctuations in liquid pressure. By throttling such flows the actions of the liquid on the liquid operated device may be steadied in any desired degree.

The three-way-valves 31 and 32 permit an emptying of the chambers 27 and 28 after removal of the screws 29 and 30. Discharge conduits 35 and 36 may be provided for this purpose which are normally closed by plugs 37 and 38.

Obviously, the present invention is not restricted to the particular embodiment thereof herein shown and described.

What is claimed is:

1. In an instrument of the kind described in combination, a differential pressure actuated diaphragm device having two liquid chambers, a dynamic operating velocity meter producing a dynamic differential liquid pressure responsive to the velocity and including two connecting tubes, one each for the two separate pressures resulting in a differential pressure, a liquid conduit leading from each of said connecting tubes to one of said liquid chambers and adapted to transmit the liquid pressure from said meter to said chambers, a constriction in each of said conduits, and a compensating chamber for each of said liquid chambers, said compensating chamber containing a charge of compressive pressure fluid and being connected to each of said conduits.

2. In a hydraulically operated pressure responsive device of the class described, a liquid chamber and an element forming a part thereof movable in opposite directions relative thereto in response to the liquid pressure therein, the liquid acting on only the chamber side of said element; a cushioning chamber communicating with said liquid chamber; means including a conduit communicating with a source of operating liquid pressure and with both chambers, said conduit being filled with said liquid to transmit the pressure impulses to said movable element; a constriction in said conduit to dampen abnormal pressure fluctuations of the liquid by throttling action; and means constituting a part of said device operatively connected to said movable element responsive to its position and its movements.

3. In a hydraulically operated pressure responsive device, more particularly for measuring or indicating the velocity of marine craft, pressure responsive means, including a diaphragm; a diaphragm chamber filled with liquid to operate the same, said diaphragm being movable in opposite directions relative to the chamber and being subjected to liquid on one side only; an air chamber above the level of said diaphragm chamber and having a conduit communicating therewith; means including a conduit leading from a source of liquid pressure to be measured and communicating with both chambers to transmit dynamic pressure impulses to the diaphragm; an adjustable constriction in said conduit to dampen abnormal pressure fluctuations imparted to the pressure liquid by throttling action; and means constituting a part of said device operatively connected to said diaphragm to transmit movements thereof to a mechanical element to be operated in proportion to the dynamic pressure.

4. In a hydraulically operated pressure responsive device for measuring or indicating pressure differentials resulting from dynamic liquid impulses, a pair of opposed expansible pressure chambers filled with liquid and having movable pressure responsive means; a conduit communicating with a source of static pressure liquid and connected to one of said expansible chambers; a separate conduit connected to a source of dynamic pressure liquid which creates the impulses and connected to the other of said expansible chambers and filled with said liquid; a cushioning chamber communicating with the expansible chamber which is subjected to the dynamic impulses; a constriction in said last named conduit to dampen abnormal pressure fluctuations of the liquid by throttling action; and means constituting a part of said device operatively connected to said movable pressure responsive means to transmit movements thereof in proportion to the dynamic pressure.

KURT BLASIG.